United States Patent [19]

Esau

[11] Patent Number: 5,009,565

[45] Date of Patent: Apr. 23, 1991

[54] FORK LIFT ATTACHMENT

[75] Inventor: LaVerne Esau, Hillsboro, Kans.

[73] Assignee: Liberty Diversified Industries, Inc., Minneapolis, Minn.

[21] Appl. No.: 439,551

[22] Filed: Nov. 20, 1989

[51] Int. Cl.[5] .......... B65G 65/34

[52] U.S. Cl. .......... 414/607; 294/88; 414/620; 414/421

[58] Field of Search .......... 414/607, 608, 732, 911, 414/422, 419, 684, 421, 783, 678, 619, 620, 621, 359, 360, 361, 763, 764, 767, 771; 401/31, 36; 294/37, 88

[56] References Cited

U.S. PATENT DOCUMENTS

| | | | |
|---|---|---|---|
| 1,646,815 | 10/1927 | Glassen | 414/359 |
| 2,645,372 | 7/1953 | Broersma | 414/620 |
| 2,704,167 | 3/1955 | Framhein . | |
| 2,826,322 | 3/1958 | Posehn . | |
| 2,842,275 | 7/1958 | Kughler . | |
| 2,971,662 | 2/1961 | Dunham | 414/421 X |
| 3,180,512 | 4/1965 | Moss | 414/618 X |
| 3,319,815 | 5/1967 | Vik . | |
| 3,410,431 | 11/1968 | Vik | 414/607 |
| 3,438,523 | 4/1969 | Vik . | |
| 3,438,669 | 4/1969 | Vik . | |
| 3,448,880 | 6/1969 | Howard . | |
| 3,472,404 | 10/1969 | Ord . | |
| 3,506,148 | 4/1970 | Vik . | |
| 3,512,670 | 5/1970 | Howard . | |
| 3,881,761 | 5/1975 | Meyer et al. | 294/88 |
| 3,893,579 | 7/1975 | Glewwe . | |
| 3,971,485 | 7/1976 | Hoppey | 414/607 X |
| 4,029,230 | 6/1977 | Bolduc et al. . | |
| 4,130,212 | 12/1978 | Gatilao . | |
| 4,304,433 | 12/1981 | Langowski | 294/88 X |
| 4,385,860 | 5/1983 | Corbin . | |
| 4,618,306 | 10/1986 | Dorsch . | |

FOREIGN PATENT DOCUMENTS

| | | | |
|---|---|---|---|
| 2533202 | 3/1984 | France | 414/607 |
| 1407894 | 7/1988 | U.S.S.R. | 294/88 |

*Primary Examiner*—Frank E. Werner
*Attorney, Agent, or Firm*—Merchant, Gould, Smith, Edell, Welter & Schmidt

[57] ABSTRACT

This invention relates to an attachment for a fork lift. The attachment permits the fork lift to handle and invert a cylindrical drum of predetermined dimensions. The attachment includes a frame carrying pivot arms which pivot between first and second positions. Distal ends of the pivot arms carry rotating clamps which grip a drum and invert the drum. A clamp motion control mechanism is provided for selectively rotating the clamps and includes a dual piston pressure actuated cylinder. An over-center locking mechanism is provided for locking the pivot arms in a gripping position.

4 Claims, 5 Drawing Sheets

FORK LIFT ATTACHMENT

I. BACKGROUND OF THE INVENTION

1. Field of the Invention

This invention pertains to an attachment for fork lifts. More particularly, this invention pertains to a fork lift attachment which enables the lifting and handling of cylindrical drums.

2. Description of the Prior Art

In the prior art, many attachments have been proposed to enable a fork lift truck to handle cylindrical drums. See, for example, U.S. Pat. Nos. 3,971,485; 3,512,670; 2,842,275; and 3,410,431.

As shown in U.S. Pat. No. 3,971,485, the prior art includes clamps rotatably carried on the distal ends of pivoting arms. The pivoting arms are pivotally attached to a frame which may be releasably connected to the forks of a fork lift truck. In the aforementioned U.S. Pat. No. 3,971,485, fluid pressure actuators are used to rotate the clamps and pivot the arms.

In constructing a fork lift attachment for handling drums, it is necessary to provide a design which is of low cost manufacture and reliable performance. Also, such a design should preferably include means for retaining a drum in a grasped state in the event of loss of fluid power to the fluid power actuators. It is one of the objects of the present invention to meet this need.

II. SUMMARY OF THE INVENTION

According to a preferred embodiment of the present invention, an attachment for a fork lift is provided. The attachment includes a frame that is attachable to the forks of a fork lift. First and second pivot arms are pivotally connected to the frame for the pivot arm distal ends to move toward and away from one another in a horizontal plane. Clamp means are carried on each of the distal ends. Means are provided for rotatably connecting the clamp means to the distal ends for the clamp means to rotate in a vertical plane.

An arm motion control means is provided for selectively urging the distal ends toward and away from one another between first and second positions. A clamp motion control means is provided for selectively rotating the clamps in any one of two rotational directions. The clamp motion control means includes a fluid pressure actuator having a cylinder which contains a reciprocating piston head. First and second piston rods are connected to the piston head for movement therewith. The first and second piston rods extend in opposite directions in response to reciprocating movement of the head. A linkage means is provided for linking the first and second piston rods to the clamp means. Accordingly, the clamps rotate in said first and second directions in response to alternate extension of the first and second piston rods. Additionally, an over-center locking mechanism is provided for locking the pivot arms in their second positions.

III. BRIEF DESCRIPTION OF THE DRAWINGS

IV. DETAILED DESCRIPTION OF THE PREFERRED EMBODIMENT

Figure 1:
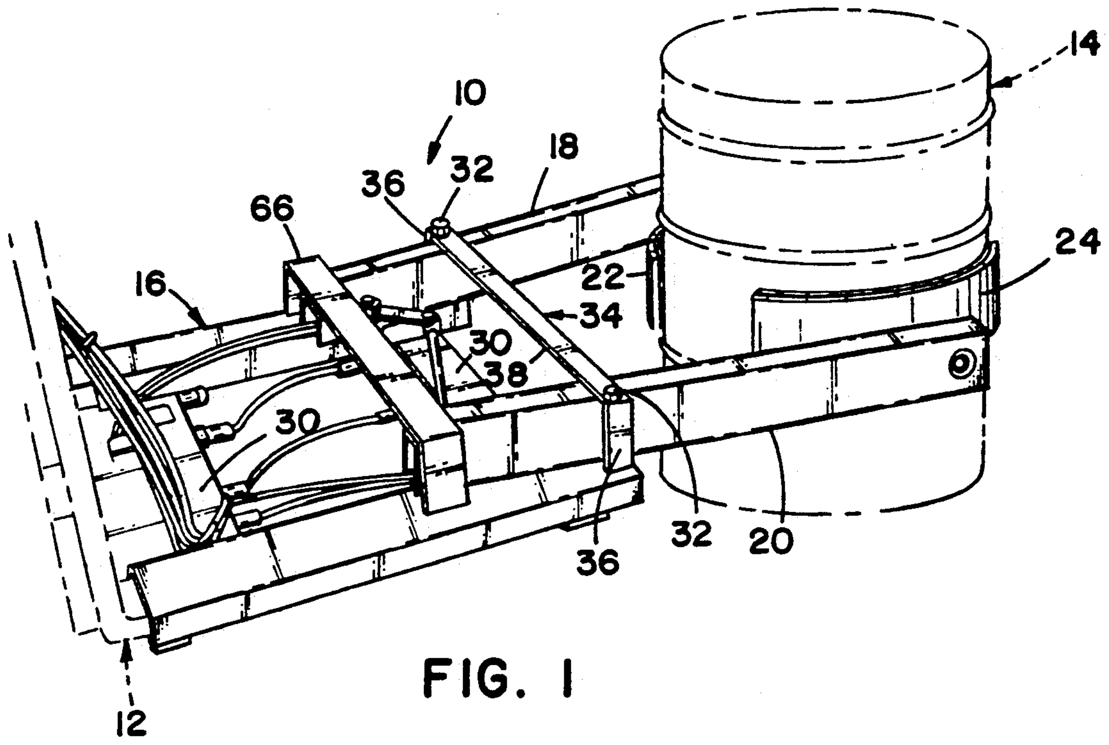
FIG. 1 is a perspective view of the attachment of the present invention attached to a fork lift (shown in phantom) and grasping a drum (shown in phantom)

With reference now to the various drawing figures in which identical elements are numbered identically throughout, a detailed description of the present invention will now be given. The present invention pertains to an attachment 10 shown best in FIG. 1 to be carried by the forks 12 (shown in phantom) of a fork lift truck (not shown). The attachment 10 is intended for use in handling a cylindrical drum 14 (shown in phantom) of known dimensions.

The attachment 10 includes a frame 16, first and second pivot arms 18 and 20, and first and second clamps 22, 24. The frame 16 includes a pair of spaced-apart U-shaped channels 26 which are inverted and sized to slidably receive the forks 12. Cross braces 30 (see FIG. 2) rigidly join the channels 26, 27.

Figure 4:
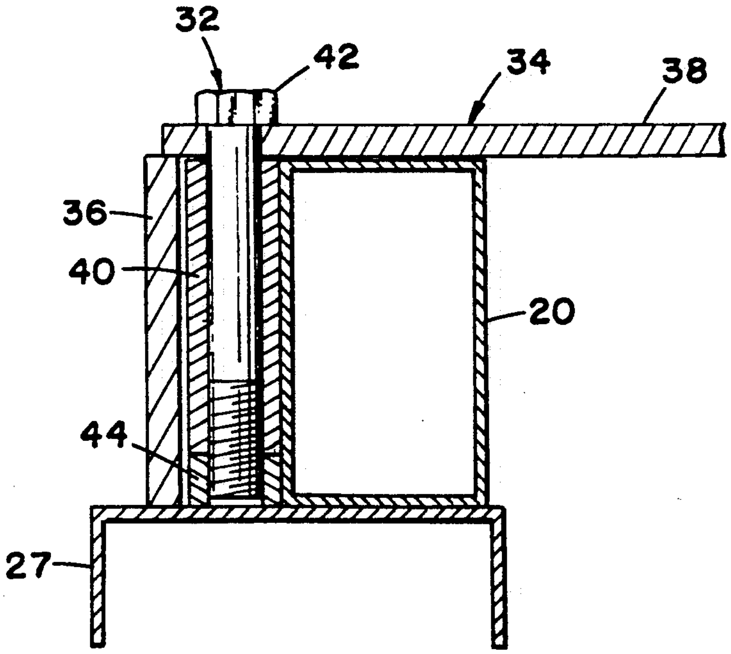
FIG. 4 is a view taken along lines 4–4 of FIG. 2.

Each of arms 18, 20 are secured to channels 26, 27 through a pivotal connection 32. FIG. 4 shows a pivotal connection 32 joining second pivot arm 20 to channel 27. A description of this connection will suffice as a description of the connection joining arm 18 to channel 26.

With reference to FIGS. 1 and 4, a bridging member 34 is provided connecting channel 26 with 27. Member 34 includes vertical plates 36 connected by a horizontal cross plate 38. Vertical plates 36 are sized for the pivot arms 20 to be received between cross plate 38 and channels 26, 27.

Pivot arm 20 includes a cylindrical collar 40 (FIG. 4) which is welded to arm 20 in a vertical orientation. A bolt 42 extends through plate 38 and collar 40. Bolt 42 is threadably received within a threaded lug 44 that is welded to channel 27. With this arrangement, bolt 42 is secured to channel 27 and arm 20 is pivotally secured to bolt 42. In a similar manner, arm 18 is pivoted to channel 26.

Figure 5:
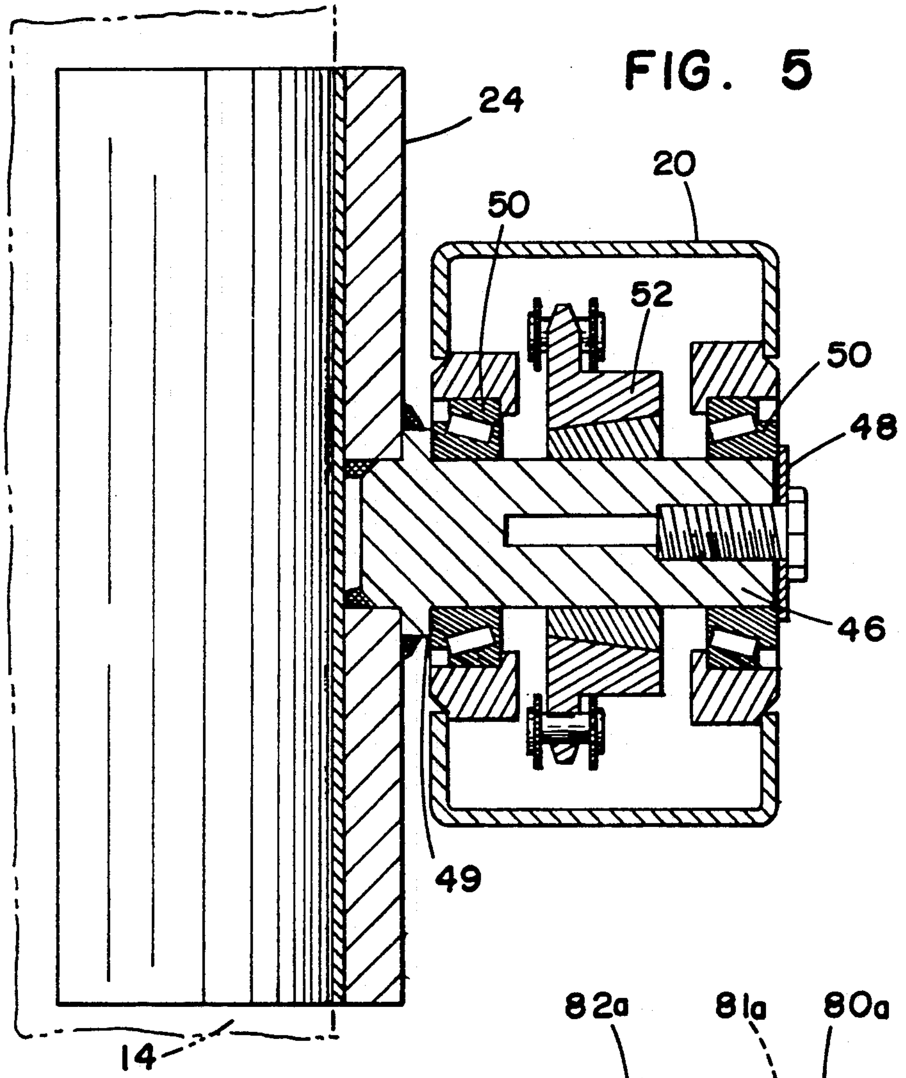
FIG. 5 is a view taken along lines 5–5 of FIG. 2.

The pivotal connections 32 are located between the proximal and distal ends of pivot arms 18, 20. Clamps 22 and 24 are rotatably connected to the distal ends. FIG. 5 shows the detail of clamp 24 connected to the distal end of arm 20. It will be appreciated that clamp 22 is similarly connected to arm 18.

As shown in FIG. 5, clamp 24 is welded to a shaft 46 that is prevented from axial movement relative to arm 20 by a nut and washer assembly 48 and a radial flange 49. The shaft 46 is journaled within bearings 50 carried on arm 20. Accordingly, shaft 46 is freely rotatable about its axis relative to arm 20. A sprocket 52 is carried on shaft 46 for rotation therewith. The function of sprocket 52 will be described later in this specification.

An arm motion control mechanism is provided for pivoting arms 18, 20 about pivot points 32. The arm motion control mechanism includes a fluid actuated cylinder 54 in cooperative assembly with an over-center locking arrangement 56.

Figure 9:
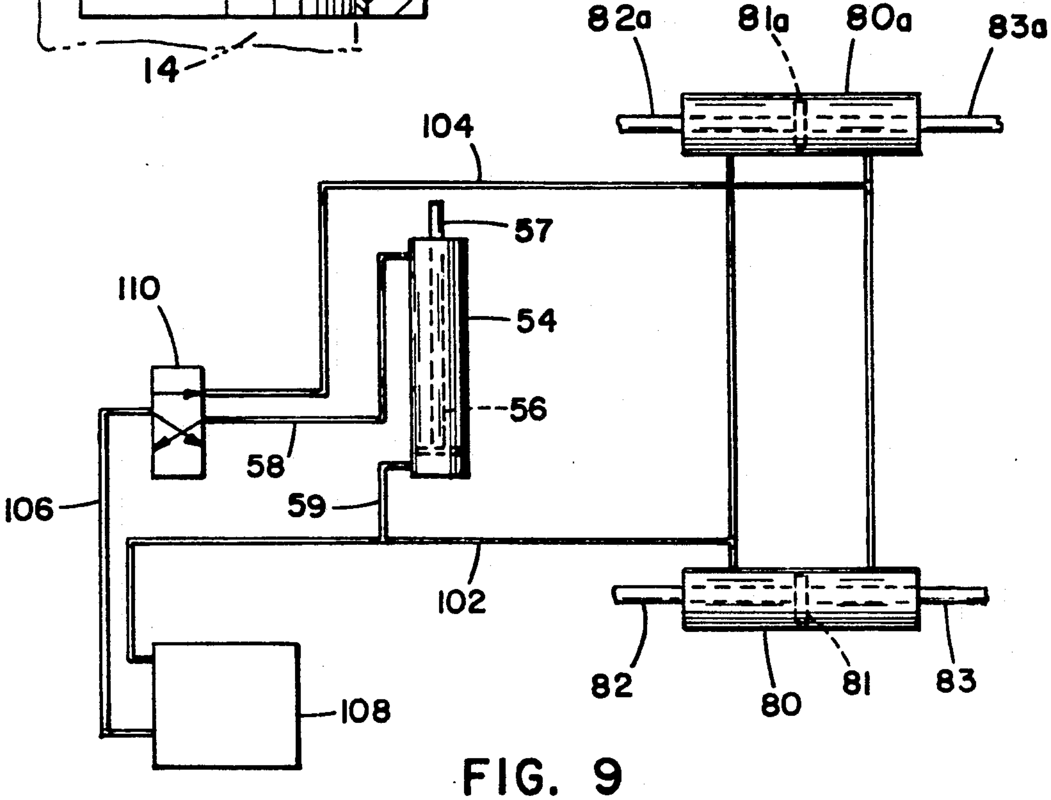
FIG. 9 is a schematic view of a hydraulic circuit for actuation of the present invention.

As schematically shown in FIG. 9, cylinder 54 includes a reciprocating piston 56 with hydraulic fluid supply lines 58, 59 for admitting or exhausting hydraulic fluid from opposite sides of a piston head in order to selectively extend or retract an exposed piston arm 57.

The over-center locking arrangement 56 includes first and second linkages 60 and 62. First linkage 60 is L-shaped and comprises first and second arms 60*a*, 60*b*. At the intersection of arm 60*a* and 60*b*, linkage 60 is pivotally connected to a bracket 62 welded to the proximal end of arm 20.

Figure 2:
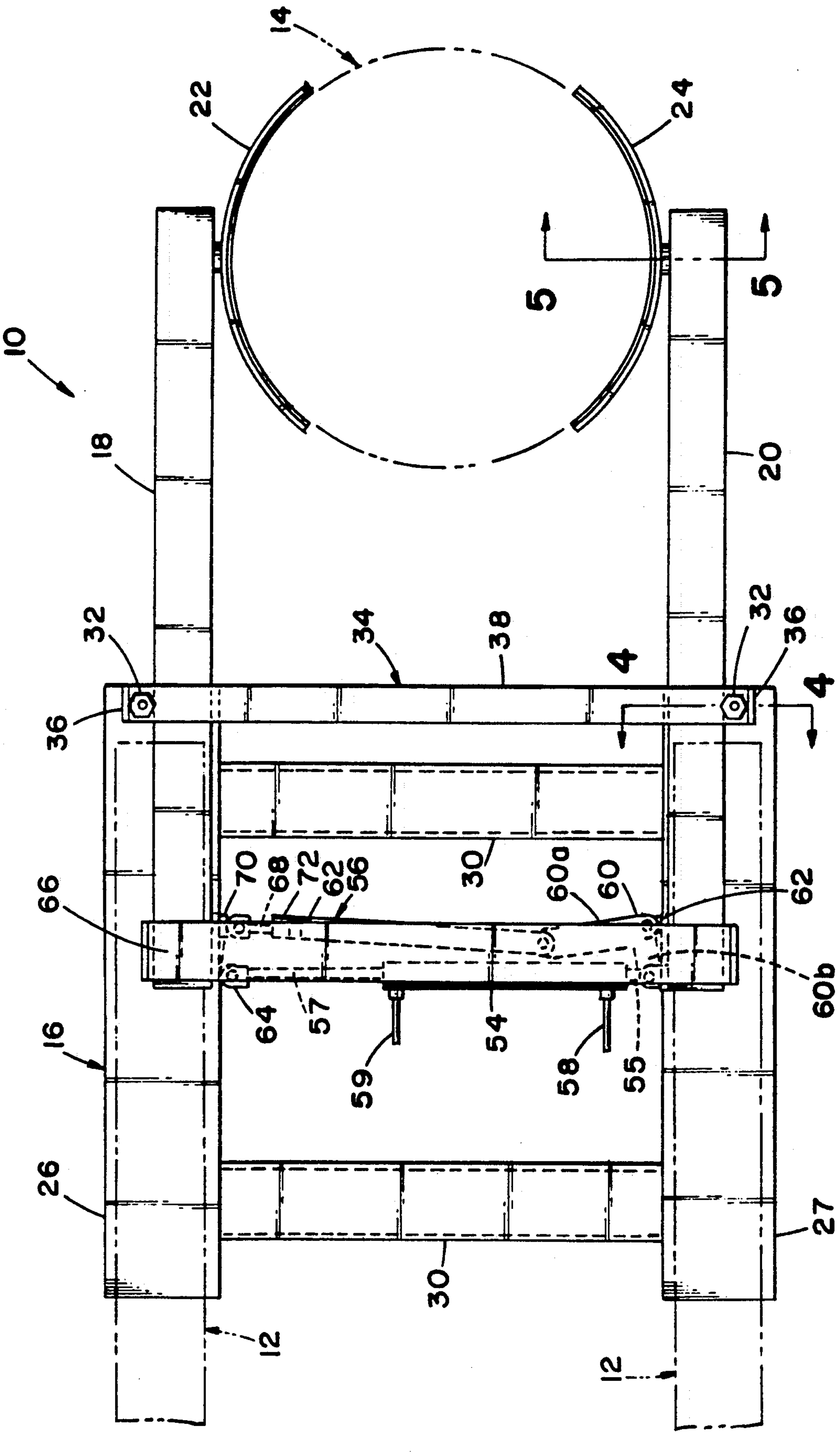
FIG. 2 is a top plan view of the attachment of FIG. 1 showing pivot arms in a second (or closed) position.
Figure 3:
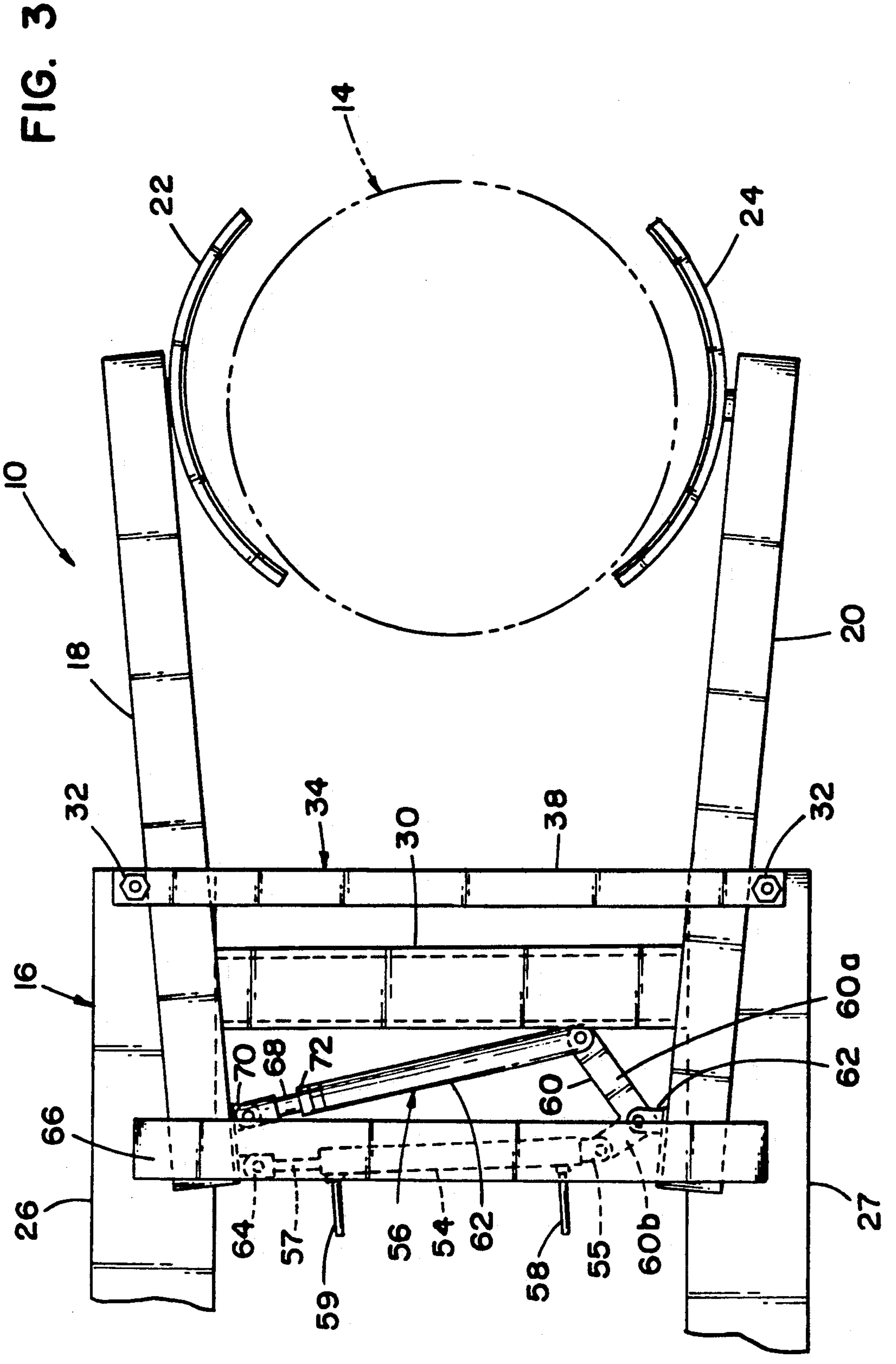
FIG. 3 is the view of FIG. 2 showing the pivot arm in the first (or open) position.

The head end 55 of cylinder 54 is pivotally connected to the free end of arm 60*b*. Extending piston rod 57 is pivotally connected to a mounting bracket 64 which is welded to the proximal end of arm 18. Accordingly, pressurization of cylinder 54 through line 59 causes piston rod 57 to contract, thereby drawing the proximal ends of arms 18 and 20 together. As a result, the distal ends (and hence, clamps 22, 24) spread apart to a spaced-apart first position as shown in FIG. 3 that is sized to freely receive a cylindrical drum 14 of predetermined dimensions. Pressurization of cylinder 54 through line 58 results in extension of piston rod 57 to urge apart the proximal ends of arms 18 and 20, and cause clamps 22, 24 to be urged to a second (or closed) position, as shown in FIG. 2. As a result, the clamps 22, 24 snugly capturing the drum 14 of predetermined dimensions. To prevent arms 18, 20 from closing too much, a retaining bracket 66 is provided surrounding the proximal ends of arms 18, 20 and welded to channels 26, 27.

To lock arms 18, 20 in the closed position (as shown in FIG. 2) and prevent accidental loss of drum 14 in the event of unintended loss of hydraulic pressure to cylinder 54, linkage 62 is provided to cooperate with linkage 60 and form the over-center locking mechanism.

Linkage 62 includes a rod 68 pivotally mounted to a bracket 70 which is welded to the proximal end of arm 18. Rod 68 is threaded and is connected to linkage arm 62 through threaded adjusting nuts 72. Accordingly, by turning nut 72, the length of exposed rod portion 68 can be adjusted to thereby adjust the length of linkage 62. It will be appreciated that threaded rod and nut combinations, in order to affect the length of a linkage 62, form no part of this invention per se.

The length of linkage 62 is selected such that the combined length of linkage 62 and arm 60*a* of linkage 62 is slightly greater than the distance between the proximal ends of arms 18, 20 in the closed position of FIG. 2. As a result, when the arms 18, 20 are pivoted to the closed position of FIG. 2, linkages 60 and 62 cooperate to form an over-center locking arrangement.

A clamp motion control mechanism is provided for selectively rotating the clamps 22, 24 about the axes of their shafts 46. A separate clamp motion control mechanism is provided for each of clamps 22, 24, and housed in each of arms 18, 20. Each such clamp motion control mechanism is identical and a description of the control mechanism for controlling the motion of clamp 24 will suffice as a description of that controlling the motion of clamp 22.

With best reference to FIGS. 5-9, the clamp motion control mechanism is shown as including a pressure actuated cylinder 80. An identical cylinder 80*a* is schematically shown in FIG. 9 for controlling the motion of clamp 22. Cylinder 80 contains a reciprocating piston head 81. Extending from opposite sides of head 81 and extending through cylinder 80 are piston rods 82 and 83. Admission of pressurized hydraulic fluid to cylinder 80 on opposite sides of head 81 through lines 84, 85 controls the amount of extension of rods 82, 83. As rod 82 extends, rod 83 retracts. Similarly, as rod 82 retracts, rod 83 extends.

Figure 6:
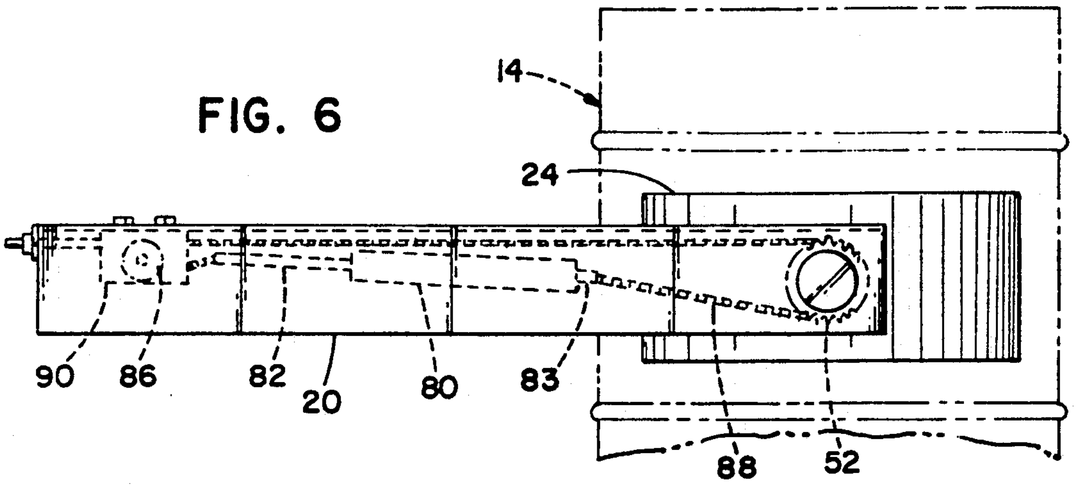
FIG. 6 is a view showing the clamp motion control mechanism of the present invention with a drum in an upright position.
Figure 7:
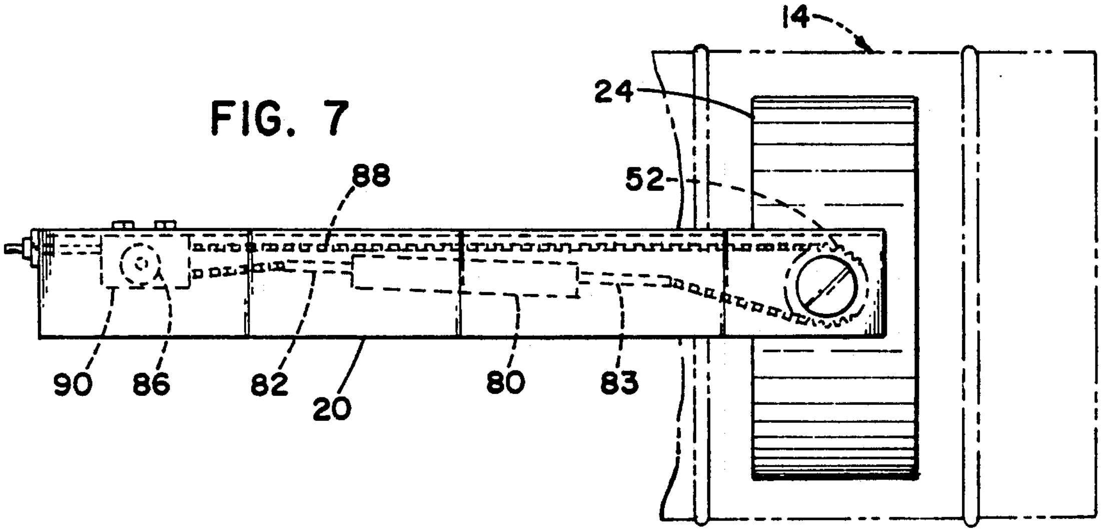
FIG. 7 is the view of FIG. 6 showing the control mechanism with the drum halfway rotated between an upright and an inverted position.
Figure 8:
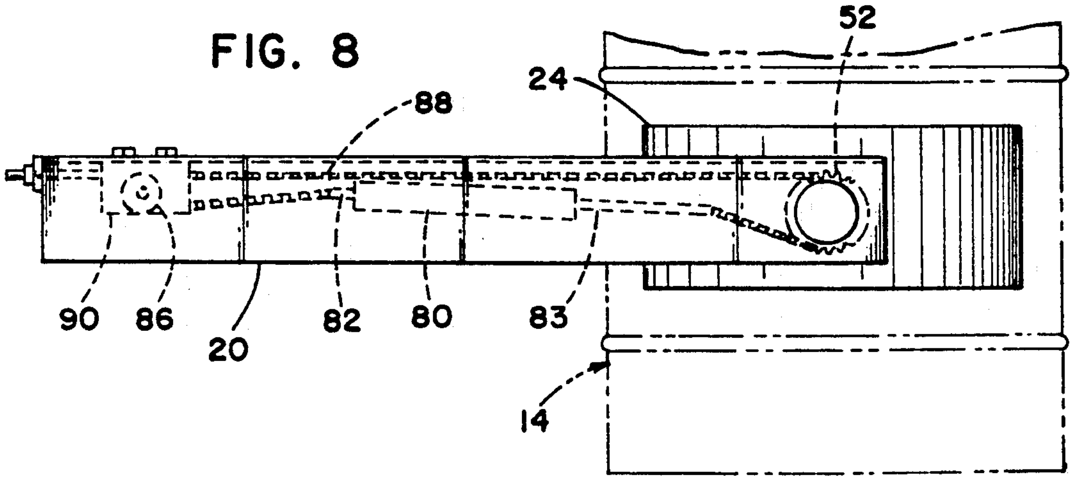
FIG. 8 is the view of FIGS. 6 and 7 showing the drum in an inverted position.

Shown best in FIGS. 6-8, cylinder 80 is mounted within arm 20 through any suitable means. A chain and sprocket assembly including drive sprocket 52, an idler sprocket 86 and a chain 88 operably connect cylinder 80 with clamp 24. The chain 88 is connected to the free ends of piston rods 82, 83 and extends around idler sprocket 86 and drive sprocket 52. Idler sprocket 86 is connected to arm 20 by a bracket 90 that is slidably positioned on arm 20 to control the tension of chain 88. It will be appreciated that slidable brackets for idler sprockets are known in the art and form no part of this invention per se.

As shown in FIG. 6, when piston rod 83 is fully retracted and rod 82 is fully extended, the clamp 24 will hold drum 14 in an upright position. As pressurized fluid is admitted through hydraulic line 84, rod 83 extends with a corresponding retraction of rod 82. When rods 82 and 83 are equally extended (as shown in FIG. 7), clamp 24 is halfway rotated. When rod 83 is fully extended (as shown in FIG. 8), clamp 24 has been inverted with a corresponding inversion of drum 14.

FIG. 9 is a schematic showing of a hydraulic circuit for operation of the attachment 10. The circuit 100 includes clamp motion control cylinders 80 and 80*a*, and arm motion control cylinder 54. Main supply lines 102 and 104 are provided for supplying pressurized hydraulic fluid to lines 84, 85, respectively, with line 102 also supplying fluid to line 59. A main feed line 106 is provided for distributing pressurized fluid from pump 108 to either of lines 58, 104. A hydraulic valve 110 is provided for switching feed line 106 between lines 58 and 104. Valve 110 is spring biased to feed line 104. Preferably, valve 110 is electrically actuated through circuitry (not shown) so an operator can select to feed either of lines 104 or 58, and thereby shift the hydraulic circuitry 100 between drum rotation mode (i.e., hydraulic fluid being supplied to cylinders 80, 80*a*) or drum pickup and release mode (i.e., hydraulic fluid being supplied to cylinder 54). Actuation of pump 108 controls the hydraulic pressure to effect movement of the cylinders 54, 80 and 80*a*.

From the foregoing detailed description of the present invention, it has been shown how the invention has been obtained in a preferred manner. However, modifications and equivalents of the disclosed concepts such as readily occur to those skilled in the art are intended to be included within the scope of this invention. Thus, the scope of the invention is intended to be limited only by the scope of the claims, which are, or which may hereafter be, appended hereto.

I claim:

1. An attachment for a fork lift comprising:

a frame having attachment means for attaching said frame to the forks of a fork lift;

first and second pivot arms, each of said pivot arms extending from a proximal end to a distal end;

means for pivotally connecting said pivot arms to said frame for said distal ends to move toward and away from one another in first predetermined plane;

first and second clamp means carried on said distal ends of said first and second pivot arms, respectively;

means for rotatably connecting said clamp means to said distal ends for said clamp means to rotate in a second predetermined plane generally perpendicular to said first predetermined plane;

arm motion control means for selectively urging said distal ends toward and away from one another, and for said arms to pivot between first and second positions with said arms in said first position spaced apart for said clamps to receive a drum of predetermined dimensions, and with said arms in said second positions disposed for said clamps to be urged against said drum;

clamp motion control means for selectively rotating said clamps in any one of at least two rotational directions, said clamp motion control means including first and second fluid pressure actuators associated with said first and second clamp means, respectively; each of said fluid pressure actuators having a cylinder and a piston head disposed within said cylinder for reciprocating motion, master control means for selectively admitting a fluid under pressure to said cylinders on opposite sides of said piston heads to selectively urge said piston heads to reciprocate within said cylinder, first and second sets of first and second piston rods connected to said piston heads of said first and second actuators, respectively, for movement therewith, said first piston rods extending in response to movement of said piston heads in a first direction and said second piston rods extending in response to movement of said piston heads in a second direction, said master control means including a master fluid pressure actuator for simultaneously urging piston heads of said first and second actuators; and linkage means for linking said first and second sets of first and second piston rods to said first and second clamp means, respectively for said clamp means to rotate in a first direction when said first piston rods extend, and to rotate in a second direction when said second piston rods extend.

2. An attachment according to claim 1 comprising lock means for locking said locking said pivot arms in said second position.

3. An attachment according to claim 2 wherein said pivot arms pivot at a pivot point located between said distal ends and said proximal ends, said lock means including an over-center locking arrangement having a first linkage pivotally secured to said first pivot arm and a second linkage pivotally secured to said second arm, with said first and second linkages cooperating to form an over-center locking arrangement between said first and second pivot arms, urging means connected to said first linkage and said second pivot arm to selectively urge said first linkage and said second pivot arm apart at said distal ends.

4. An attachment for a fork lift comprising:

a frame having attachment means for attaching said frame to the forks of a fork lift;

first and second pivot arms, each of said pivot arms extending from a proximal end to a distal end;

means for pivotally connecting said pivot arms to said frame for said distal ends to move toward and away from one another in a first predetermined plane;

first and second clamp means carried on said distal ends of said first and second pivot arms, respectively;

means for rotatably connecting said clamp means to said distal ends for said clamp means to rotate in a second predetermined plane generally perpendicular to said first predetermined plane;

arm motion control means for selectively urging said distal ends toward and away from one another, and for said arms to pivot between first and second positions with said arms in said first position spaced apart for said clamps to receive a drum of predetermined dimensions, and with said arms in said second positions disposed for said clamps to be urged against said drum;

clamp motion control means for selectively rotating said clamps in any one of at least two rotational directions, said clamp motion control means including a fluid pressure actuator having a cylinder and a piston head disposed within said cylinder for reciprocating motion, means for selectively admitting a fluid under pressure to said cylinder on opposite sides of said piston head to selectively urge said piston head to reciprocate within said cylinder, first and second piston rods connected to said piston head for movement therewith, said first piston rod extending in response to movement of said piston head in a first direction and said second piston rod extending in response to movement of said piston head in a second direction;

linkage means for linking said first and second piston rods to said clamp means for said clamp means to rotate in a first direction when said first piston rod extends, and to rotate in a second direction when said second piston rod extends;

lock means for locking said pivot arms in said second position;

said pivot arms pivot at a pivot point located between said distal ends and said proximal ends, said lock means including an over-center locking arrangement having a first linkage pivotally secured to said first pivot arm and a second linkage pivotally secured to said second arm, with said first and second linkages cooperating to form an over-center locking arrangement between said first and second pivot arms, urging means connected to said first linkage and said second pivot arm to selectively urge said first linkage and said second pivot arm apart at said distal ends; and said first linkage is pivotally secured to said first arm, said first linkage including first and second linkage arms with said urging means connected to said first arm and said second linkage connected to said second arm; said second arm and said second linkage having a combined length selected to be slightly greater than a predetermined length between said proximal ends when said pivot arms are pivoted to said second position.

* * * * *

UNITED STATES PATENT AND TRADEMARK OFFICE
CERTIFICATE OF CORRECTION

PATENT NO. : 5,009,565

DATED : April 23, 1991

INVENTOR(S) : LaVerne Esau

It is certified that error appears in the above-identified patent and that said Letters Patent is hereby corrected as shown below:

On the title page:
In the Abstract, line 1, delete "This invention relates to" after the word "Abstract".

At column 4, line 68, insert --a-- after the word "in".

At column 5, line 47, delete "said locking" after the word "locking".

Signed and Sealed this

Eighth Day of December, 1992

*Attest:*

DOUGLAS B. COMER

*Attesting Officer* *Acting Commissioner of Patents and Trademarks*